2,564,388

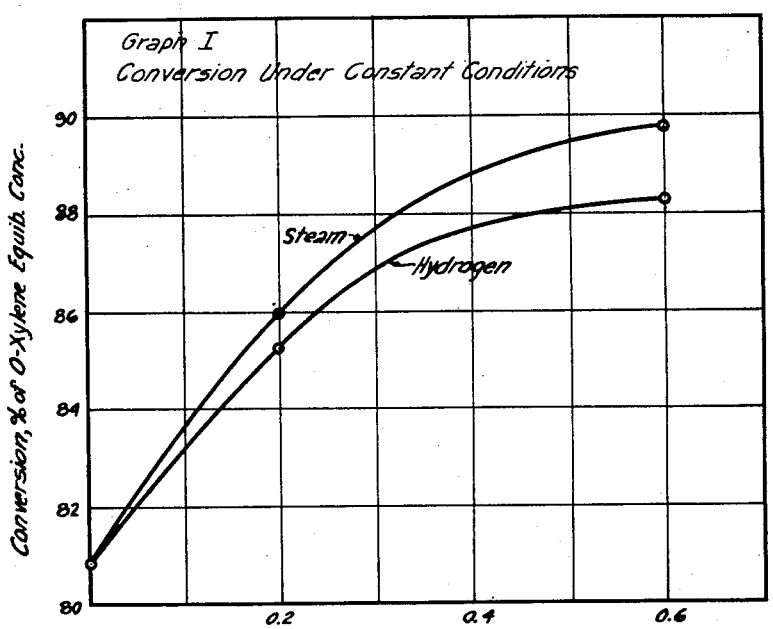
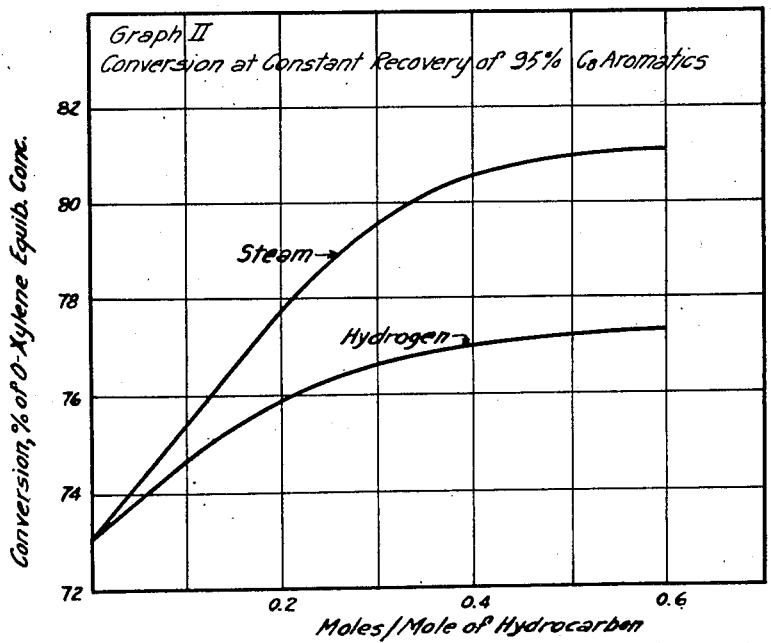

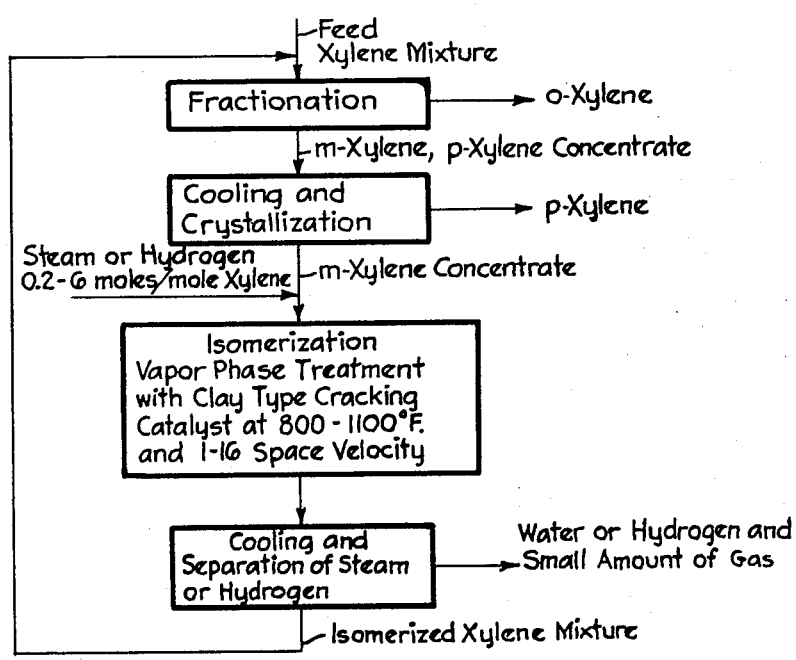
Fig. I
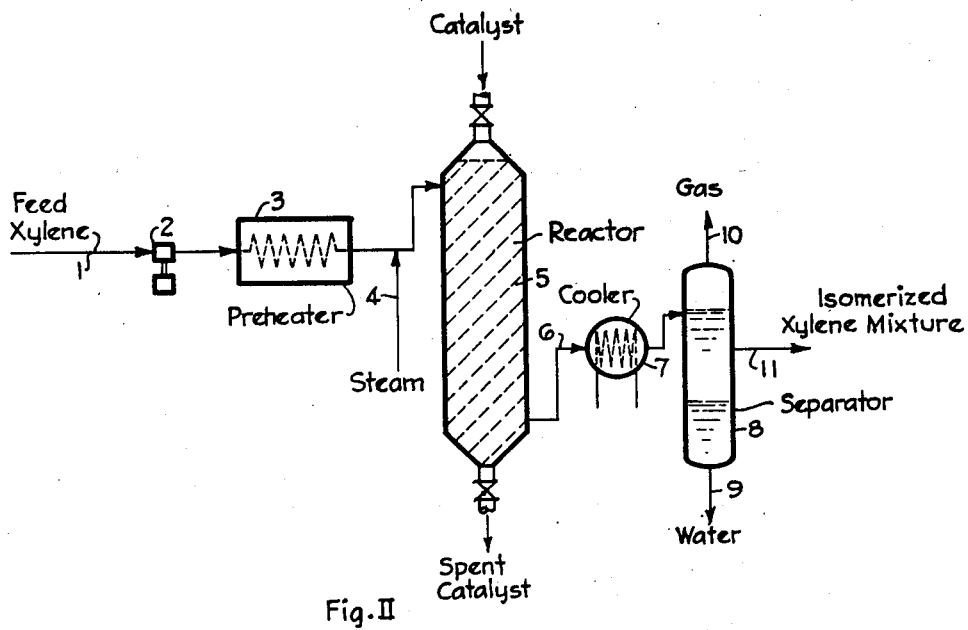
Fig. II
Inventors
Clarence S. Bennett
William A. Bailey, Jr.
By their Attorney Patented Aug. 14, 1951

UNITED STATES PATENT OFFICE 2,564,388

ISOMERIZATION OF XYLENES

Clarence S. Bennett, Long Beach, and William A. Bailey, Jr., Walnut Creek, Calif., assignors to Shell Development Company, San Francisco, Calif., a corporation of Delaware Application January 9, 1950, Serial No. 137,592

9 Claims. (Cl. 260—668)

This invention relates to the catalytic isomerization of xylenes.

It is well known that the isomeric forms of xylene, namely o-xylene, m-xylene, and p-xylene, can be converted one into the other by isomerization. However, the isomerization is difficult to accomplish. When the isomerization is carried out under conditions to give a relatively selective and clean-cut isomerization the reaction takes place at a rate which is too slow for practical, commercial operation. Even when the isomerization is carried out under relatively drastic conditions leading to appreciable degradation, the reaction is quite slow. The xylenes may be isomerized by purely thermal means or by treatment under certain conditions with Friedel-Crafts type catalysts, e. g. aluminum chloride plus hydrogen chloride, but the required conditions are severe, the reaction is very slow, and the yields are poor. The xylenes may also be isomerized at temperatures in the order of 750-1000° F. through the use of a silica-alumina type catalyst as shown, for instance, in U. S. Patent No. 2,403,757. When operating under conditions to avoid extensive cracking and disproportionation the isomerization is quite slow, and when operating under more severe conditions the predominant reactions are cracking and disproportionation and the yields are very low (see Ind. Eng. Chem. 37, 671 (1945)).

In the process of this invention xylenes are isomerized at an enhanced rate by treating them with hydrogen and/or steam under suitable conditions of temperature and pressure in the presence of a carbonium ion-forming catalyst. In a preferred embodiment of the invention the isomerization is also carried out in the presence of added ethyl benzene.

As is known, the xylenes tend to approach an equilibrium composition when treated under isomerization conditions. The composition at equilibrium depends upon the temperature. As pointed out, the rate of isomerization is normally quite slow. Furthermore, the rate of change in the composition materially slows up as the equilibrium composition is approached. Consequently the equilibrium composition is rarely if ever reached. According to the best available data [Pitzer, et al., Bur. Standards J. Research 37, 95 (1946)] the following are the equilibrium compositions at the listed temperatures.

|  | 800° F. | 980° F. | 1160° F. |
|---|---|---|---|
| o-xylene, mole per cent | 22.4 | 22.8 | 23.1 |
| m-xylene, mole per cent | 47.8 | 45.8 | 43.9 |
| p-xylene, mole per cent | 21.5 | 20.6 | 19.8 |
| Ethylbenzene, mole per cent | 8.3 | 10.8 | 13.2 |

The equilibrium composition may be approached in the present process from any other composition of the respective isomers. Thus, for example, o-xylene and/or m-xylene may be converted to p-xylene, o-xylene and/or p-xylene may be converted to m-xylene, or m-xylene and/or p-xylene may be converted to o-xylene. While ethylbenzene must be considered in the equilibrium composition, its action is different than that of the xylenes in the isomerization and its effect requires separate consideration. While we may isomerize any pure xylene or mixture of xylenes having other than the equilibrium composition, we prefer to isomerize either a relatively pure xylene or a mixture appreciably removed from the equilibrium composition. The process is particularly suited, for example, for the production of o-xylene and p-xylene from commercial m-xylene concentrates. Usually one has as a starting material the usual commercial xylene which consists of a mixture of the various isomers. The composition of such mixtures usually is not too far removed from the equilibrium composition. In this usual case it is desirable to remove a part of the o-xylene, e. g., by superfractionation. A part of the p-xylene may then be separated in a substantially pure form by crystallization if desired. The resulting mixture rich in m-xylene may then be advantageously isomerized to produce further quantities of o-xylene and/or p-xylene.

In the method of this invention the xylene is isomerized through the use of a carbonium ion-forming catalyst. It is found that certain catalysts are operative through their ability to catalyze the formation of carbonium ions and that catalysts of this type are required in the present process. The group of catalysts of various compositions known in the art as clay type cracking catalysts are of this type and are the preferred catalysts for use in the present process. Although these solid microporous clay type catalysts may be made from various other materials, the most common catalysts of the type are either special acid treated clays or synthetic materials composed largely of silica in combination with alumina, magnesia, zirconia or boric oxide. Since these catalysts and their preparation are well known in the art, and since the use of a catalyst of this particular type is not considered to be a unique feature of the process, it is not considered necessary to discuss them in further detail.

The isomerization may be carried out at any pressure. Pressures from essentially atmospheric pressure up to above 500 atmospheres have been applied with substantially the same results. Temperatures within the range of about 800° F. to about 1100° F. are applicable. The space rate is correlated with the temperature in the usual manner to afford the desired degree of conversion and may vary from about 1 to about 16. The space rate is specified in terms of the liquid hourly space velocity (L. H. S. V.) which is defined as the volumes of the hydrocarbon feed, measured as a liquid, passed in contact with the volume of the catalyst in one hour.

The most important feature of the present method is based upon the discovery that, for some reason which cannot be explained, the isomerization using the specified particular type of catalyst is considerably enhanced by the presence of appreciable amounts of hydrogen and/or steam. Steam is more effective than hydrogen. The effects of steam and hydrogen in materially increasing the rate of isomerization under these conditions will be seen in the following examples in which a typical commercial feed having the following inspection data was used.

| | Ortho-lean Xylene Feed |
|---|---|
| Gravity, °API | 31.8 |
| Aromatics, by sulfonation, per cent v | 98 |
| ASTM Distillation, °F.: | |
| IBP | 271 |
| FBP | 312 |
| 10% | 275 |
| 50 | 277 |
| 90 | 278 |
| 95 | 279 |
| Precision Distillation, per cent v.: | |
| 200° F | 0.0 |
| 250 | 0.0 |
| 300 | 96.7 |
| 300+F | 3.3 |
| Analysis, per cent v.: | |
| Toluene | 0.2 |
| Ethylbenzene | 8.9 |
| o-Xylene | 5.0 |
| m-Xylene | 60.1 |
| p-Xylene | 25.8 |
| | 100.0 |

This feed was a typical commercial m-xylene concentrate produced by the removal of a part of the o-xylene by superfractionation.

The isomerizations were carried out under various conditions ranging between the following limits:

Temperature _____ 805° F.–1101° F.
Pressure _____ 1 atm.–57 atm.
L. H. S. V _____ 1–16 with and without various amounts of various added materials. The enhancement in the isomerization by steam and hydrogen is illustrated by the following conversions obtained in comparable operations.

| Steam or hydrogen, moles/mole of feed | Conversion per cent of o-xylene Equilib. Conc. | Per Cent Recovery, b. v. C₈ aromatics |
|---|---|---|
| None | 80.9 | 87.3 |
| Hydrogen, 0.2:1 | 85.4 | 90.0 |
| Hydrogen, 0.6:1 | 88.1 | 91.6 |
| Steam, 0.2:1 | 85.9 | 86.4 |
| Steam, 0.6:1 | 89.8 | 89.7 |

These results are based upon runs at 1000° F., one atmosphere pressure and an L. H. S. V. of four, which may be considered as typical conditions. The catalyst in each case was a typical synthetic silica-alumina cracking catalyst, produced by the American Cyanamid Company. The effect is more easily seen from the plot of the above conversions in graph I in the accompanying drawing. Referring to graph I it will be seen that both steam and hydrogen are quite effective in enhancing the isomeriation. Since, as pointed out, the rate declines rapidly as the equilibrium composition is approached, it is considered that the differences in conversion shown in the range of 80–90% of the equilibrium concentration of o-xylene are quite significant.

While the improvement shown in graph I is quite significant the differences in the conversion in this range are even better illustrated when based on a common recovery. Thus, when the conversions are based (through suitable correlations) on a recovery of C₈ aromatics of 95% they are as follows:

| Steam or hydrogen, moles/mole of feed | Conversion, per cent of o-xylene Equilib. Conc. |
|---|---|
| None | 73.0 |
| Hydrogen, 0.2:1 | 75.9 |
| Hydrogen, 0.6:1 | 77.2 |
| Steam, 0.2:1 | 77.8 |
| Steam, 0.6:1 | 81.0 |

The effects of hydrogen and steam on this more comparable basis are shown in graph II of the accompanying drawing. The considerable improvement and the considerable superiority of steam over hydrogen are manifest. It will be noted that the effects of steam and hydrogen are more or less lineal with concentrations up to about 0.3 mole per mole of the hydrocarbon feed, after which they tend to level off. A mole ratio of 6.4:1 did not show any appreciable further improvement. Therefore, while a mole ratio of 0.2:1 gives a substantial improvement and is applicable, we prefer to employ concentrations between about 0.3:1 and 6:1. When operating at substantially atmospheric pressure, as in the above examples concentrations between about 0.4:1 and about 1:1 are preferred, but when operating at higher pressures higher concentrations of steam or hydrogen give a somewhat further advantage.

As stated above, the role of ethylbenzene in the isomerization requires separate consideration. On the one hand, small amounts in the order of 2%–5% of ethylbenzene are produced during the isomerization of xylenes. On the other hand, ethylbenzene is known to be much more easily cracked than the xylenes [see Ind. Eng. Chem. 37, 1169 (1945)] and under the conditions specified it tends to crack at an appreciable rate. Consequently, only very small amounts of xylenes can be produced from ethylbenzene when effecting the isomerization with the specified type of catalyst under the specified conditions. As shown by the following equation, xylene $\rightleftarrows$ ethylbenzene $\rightarrow$ cracked products

when a xylene or a mixture of xylenes is treated by the described process, a small but appreciable amount of the xylene is isomerized to ethylbenzene which then tends to crack. This can lead to an appreciable loss of xylene. In a preferred embodiment of the present process a certain amount of ethylbenzene is included in the feed. This ethylbenzene may be partly cracked, and if a sufficient amount is present it may contribute in a small way to the production of the desired xylene, but this is not important; the main function of the ethylbenzene is to contribute to the xylene yield through its mass action effect. As shown above, the equilibrium concentration of ethylbenzene is in the order of 8.3 to 13.2 mole per cent. Concentrations of ethylbenzene in this range are quite suitable, although lower concentrations down to about 5% and higher concentrations up to about 40% may be employed in the feed. When concentrations somewhat above the equilibrium concentration are applied, it is advantageous to separate the ethylbenzene from the product and recycle it to the process. Thus, for example, when isomerizing an o-xylene-lean feed the product may be sharply fractionated to separate the o-xylene produced and the remaining material containing the excess ethylbenzene may be recycled.

Since olefins are known to form carbonium ions quite readily with catalysts of the type here used, it was tried to promote the isomerization further through the addition of various small amounts of olefins. It was found, however, that the added olefins slightly decreased the isomerization, rather than improving it, and also tended to foul the catalyst with carbonaceous deposits. The presence of olefins is evidently detrimental.

The above described typical application of the invention is illustrated in the schematic process diagram shown in Figure I of the accompanying drawings.

A typical arrangement for carrying out the isomerization step is illustrated diagrammatically in Figure II of the drawings. Referring to Figure II, the feed xylene enters by line 1 and is pumped at the desired feed rate by pump 2 through a preheater 3 wherein it is heated to the desired reaction temperature. The required amount of steam is introduced by line 4 and the mixture then passed to the reactor 5 which is filled with the catalyst. The isomerized product leaves the reactor by line 6 and after cooling in cooler 7, it is passed to a separator 8. Water condensate separates as a lower layer which is withdrawn by line 9. A small amount of gas is withdrawn from the top by line 10, and the isomerized xylene mixture is withdrawn by line 11.

We claim as our invention:

1. The process for the isomerization of xylenes which comprises contacting a xylene with from 0.2 mole to 6 moles per mole of xylene of a gas selected from the group consisting of steam and hydrogen at a temperature between about 800° F. and about 1100° F. and at a liquid hourly space velocity between about 1 and about 16 and above that affording substantial disproportionation in the presence of a clay-type cracking catalyst.

2. The process for the isomerization of xylenes which comprises contacting a xylene with from 0.2 mole to 6 moles of steam per mole of xylene at a temperature between about 800° F. and about 1100° F. and at a liquid hourly space velocity between about 1 and about 16 and above that affording substantial disproportionation in the presence of a clay-type cracking catalyst.

3. A process according to claim 2 further characterized in that the xylene treated contains more than the equilibrium concentration of ethylbenzene.

4. A process according to claim 2 further characterized in that the said clay-type cracking catalyst is a synthetic composite of a major amount of silica and a minor amount of alumina.

5. The process for the isomerization of xylenes which comprises contacting a xylene with from 0.2 mole to 6 moles of hydrogen per mole of xylene at a temperature between about 800° F. and about 1100° F. and at a liquid hourly space velocity between about 1 and about 16 and above that affording substantial disproportionation in the presence of a clay-type cracking catalyst.

6. The process for the production of p-xylene from a mixture of isomeric xylenes which comprises contacting a mixture of isomeric xylenes containing more than the equilibrium concentration of m-xylene at the temperature employed with from 0.2 mole to 6 moles of steam per mole of xylene at a temperature between about 800° F. and about 1100° F. and at a liquid hourly space velocity between 1 and about 16 and above that affording substantial cracking in the presence of a clay-type cracking catalyst, and recovering substantially pure p-xylene from the resulting mixture of isomerized xylenes.

7. The process for the production of o-xylene from a mixture of three isomeric xylenes approaching the equilibrium composition which comprises the combination of steps of blending said feed mixture of xylenes with an o-xylene-rich product produced as hereinafter specified, separating substantially pure o-xylene from the blend by fractionation, mixing the remaining o-xylene-lean mixture with from 0.2 mole to 6 moles of steam per mole of hydrocarbon feed and contacting the mixture at a temperature between about 800° F. and 1100° F. and at a liquid hourly space velocity between about 1 and about 16 and above that affording substantial disproportionation with a clay-type cracking catalyst thereby to isomerize said xylenes and produce an o-xylene-rich mixture, and blending said o-xylene-rich mixture with said feed mixture as aforesaid.

8. The process for the production of substantially pure p-xylene from a mixture of isomeric xylenes approaching the equilibrium composition which comprises the combination of steps of blending said feed mixture of xylenes with an isomerized p-xylene-rich product produced as hereinafter specified, separating a part of the o-xylene from the blend by fractionation, cooling the remaining o-xylene-lean mixture to crystallize out a portion of the p-xylene, removing the substantially pure p-xylene thus separated, mixing the remaining xylene mixture with said separated o-xylene and with from about 0.2 to about 6 moles of steam per mole of hydrocarbon feed, contacting the resulting mixture at a temperature between about 800° F. and 1100° F. at a liquid hourly space velocity between about 1 and about 16 and above that affording substantial disproportionation with a clay-type cracking catalyst, thereby to isomerize said xylenes and produce a p-xylene-rich mixture, and blending said p-xylene-rich mixture with said feed mixture as aforesaid.

9. A process for the production of o-xylene from a mixture of isomeric xylenes rich in m-xylene which comprises the combination of steps of blending said feed with an o-xylene-rich isomerized product containing more than the equilibrium concentration of ethylbenzene, separating a part of the o-xylene from the blend by fractionation, mixing the remaining o-xylene-lean mixture containing said ethylbenzene with from about 0.2 to about 6 moles of steam per mole of hydrocarbon, contacting the mixture at a temperature between about 800° F. and 1100° F. and at a liquid hourly space velocity between about 1 and about 16 and above that affording substantial side reactions with a clay-type cracking catalyst thereby to isomerize said xylenes and produce an o-xylene-rich mixture containing said ethylbenzene, and blending said o-xylene rich mixture with said feed as aforesaid.

CLARENCE S. BENNETT.
WILLIAM A. BAILEY, Jr.

REFERENCES CITED

The following references are of record in the file of this patent:

UNITED STATES PATENTS

| Number | Name | Date |
| --- | --- | --- |
| 2,340,815 | Lidov | Feb. 1, 1944 |
| 2,380,279 | Welty | July 10, 1945 |
| 2,403,757 | Reeves | July 9, 1946 |
| 2,425,559 | Passino et al. | Aug. 12, 1947 |